United States Patent [19]
Spears et al.

[11] Patent Number: 6,139,744
[45] Date of Patent: Oct. 31, 2000

[54] WASTE TREATMENT DEVICE AND METHOD EMPLOYING THE SAME

[75] Inventors: David Spears, Aliso Viejo; R. C. Shades, Laguna Niguel; Christina Edvardsson, Oceanside; D. Glen Raiger, Newport Beach, all of Calif.

[73] Assignee: Microseptec, Inc., Laguana Hills, Calif.

[21] Appl. No.: 09/369,480

[22] Filed: Aug. 6, 1999

Related U.S. Application Data

[63] Continuation-in-part of application No. 09/007,351, Jan. 15, 1998, Pat. No. 6,048,452, which is a continuation-in-part of application No. 08/901,295, Jul. 5, 1997, Pat. No. 5,958,252.

[51] Int. Cl.[7] .................................................. C02F 3/02
[52] U.S. Cl. ........................ 210/614; 210/143; 210/151; 210/180; 210/201; 210/259; 210/631; 210/739; 210/774; 210/620
[58] Field of Search ............................ 210/85, 143, 150, 210/151, 180, 181, 186, 188, 257.1, 258, 259, 260, 614, 620–623, 631, 739, 774, 800, 805, 806, 201, 202, 220, 221.2, 513, 610

[56] References Cited

U.S. PATENT DOCUMENTS

| | | | |
|---|---|---|---|
| 3,762,549 | 10/1973 | Crampton | 210/180 |
| 4,115,266 | 9/1978 | Ohshima | 210/513 |
| 4,631,133 | 12/1986 | Axelrod | 210/739 |
| 4,718,358 | 1/1988 | Nomi et al. | 110/346 |
| 4,937,411 | 6/1990 | Suzuki et al. | 219/10.55 R |
| 5,145,576 | 9/1992 | Lataillade | 210/180 |
| 5,229,010 | 7/1993 | Fluchel | 210/748 |
| 5,276,924 | 1/1994 | Hachima | 4/111.1 |
| 5,290,438 | 3/1994 | Wilkins | 210/177 |
| 5,447,630 | 9/1995 | Rummler | 210/186 |
| 5,454,953 | 10/1995 | Waibel | 210/664 |
| 5,462,676 | 10/1995 | Pitts | 210/774 |
| 5,547,582 | 8/1996 | Waibel | 210/664 |
| 5,647,986 | 7/1997 | Nawathe et al. | 210/614 |
| 5,725,762 | 3/1998 | Beal | 210/181 |
| 5,843,304 | 12/1998 | Marchesseault | 210/659 |
| 5,853,579 | 12/1998 | Rummler et al. | 210/180 |
| 5,985,149 | 11/1999 | Raetz et al. | 210/614 |

*Primary Examiner*—Joseph W. Drodge
*Attorney, Agent, or Firm*—R. William Graham

[57] ABSTRACT

A waste treatment device for treating waste having both liquids and solids therein includes a primary waste reservoir which receives influent waste and includes biological decomposing enhancing media for enhancingly biodegrading the waste rendering a first phase separation of solids and liquids and a secondary waste reservoir operably connected to the primary waste reservoir to receive substantially liquid waste having suspended solids therein and includes biological decomposing enhancing media for biodegrading the received waste rendering a second phase separation of solids and liquids. A solids processor is operably connected to at least one of the primary waste reservoir and secondary reservoir to receive solids waste therefrom in a manner to permit combustion of a substantial part the solids and generate a resultant waste, ash and gas, and liquid processor is also operably connected to the secondary waste reservoir to receive a resultant liquid waste and treat the resultant liquid waste in a manner to render an environmentally safe water. The device further includes a gas processor operably interconnecting the solids processor and primary waste reservoir to treat the gas in a manner to render a resultant environmentally acceptable air. A method of waste treatment is also provided.

61 Claims, 8 Drawing Sheets

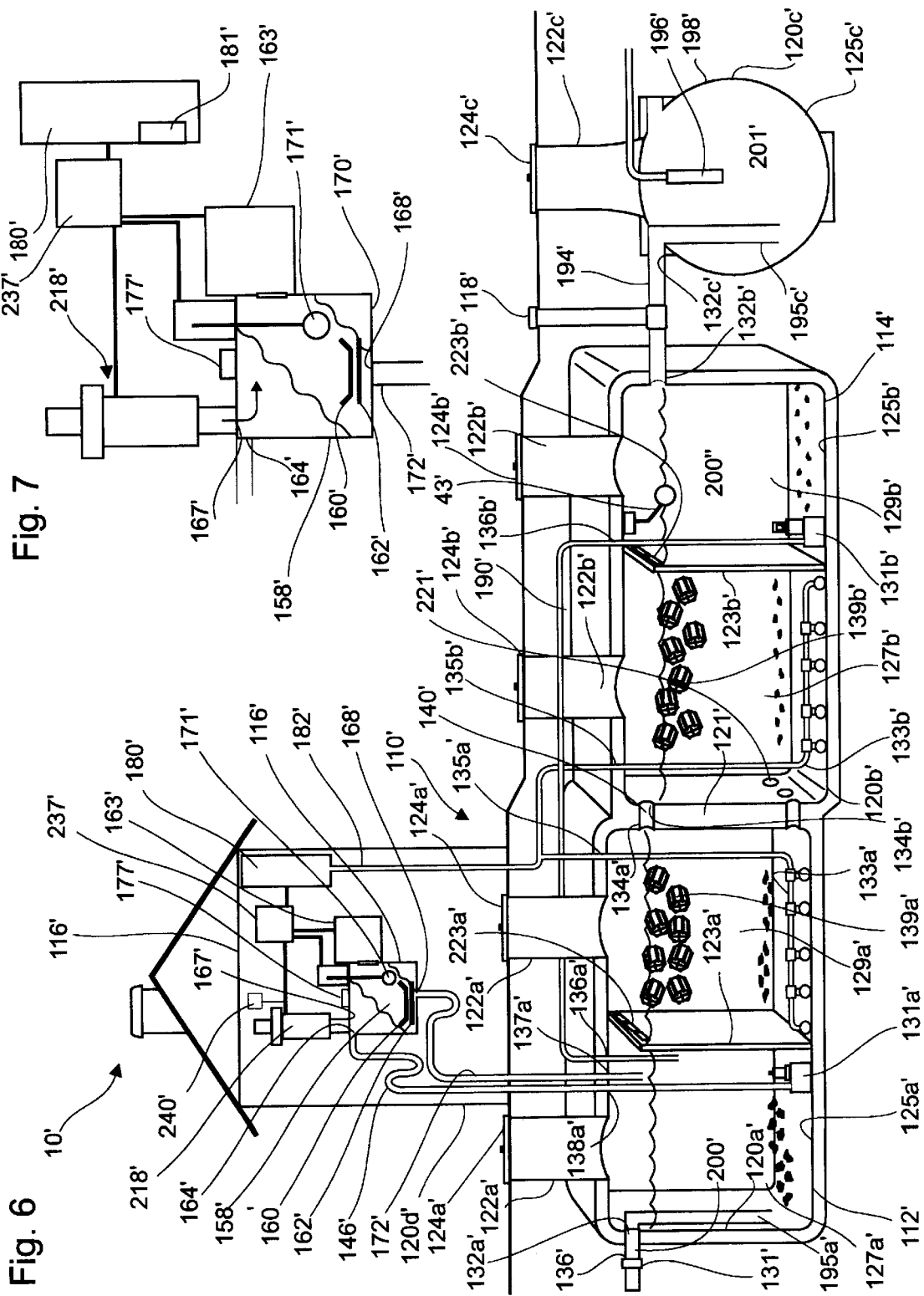

WASTE TREATMENT DEVICE AND METHOD EMPLOYING THE SAME

This a continuation-in-part of application U.S. Ser. No. 09/007,351 filed Jan. 15, 1998 now U.S. Pat. No. 6,048,452, which is a continuation-in-part of application U.S. Ser. No. 08/901,295, filed Jul. 5, 1997, now U.S. Pat. No. 5,958,252.

BACKGROUND OF THE INVENTION

1. Field of the Invention

The present invention relates to a device and method for treating waste. More particularly, the present invention is directed to a device and method which treats human and animal sewage, by way of increased biological processing, incineration and purification.

2. Related Art

Human and animal waste is commonly known as occurring in two types, i.e., black water, e.g., fecal waste, and grey water, e.g., waste from all sources other than that including fecal material. Applicants have made significant advances in the treatment of such waste as described in parent applications U.S. Ser. No. 08/901,295 filed Jul. 5, 1997, now U.S. Pat. No. 5,958,252 and U.S. Ser. No. 09/007,351 filed Jan. 15, 1998, now U.S. Pat. No. 6,048,452. The applications disclose devices for treating such waste using a plurality of interconnected tanks to receive waste and separate solids and liquids and treat the same to render environmentally acceptable bi-products. These systems primarily relied on incineration with the subsequent liquid and gas treatment.

Cost effective treatment of fecal solid material (hereinafter referred to as "large particulate waste") as well as biochemical oxygen demand (BOD), chemical oxygen demand (COD), total suspended solids (TSS), bacteria, microbiological organisms, viruses, salts, phosphorous and nitrogen (hereinafter collectively referred to as "small particulate waste") remain a significant problem in the treatment of human and animal waste. While these prior innovations have improved waste treatment methods and apparatus, they require a relatively significant amount of energy and cost.

There remains a need to improve the method and device for treatment of human and animal waste in a more efficient manner. The present invention sets forth a device and method which meet these needs.

BRIEF SUMMARY OF THE INVENTION

It is an object to improve disposal of human or animal waste in an economical and effective manner.

It is still another object to improve the device for treating disposal of human or animal waste in a more environmentally acceptable manner.

Accordingly, the present invention is directed to a waste treatment device. The device includes a primary waste reservoir which receives influent waste and includes biological decomposing enhancing media for enhancingly biodegrading the waste rendering a first phase separation of solids and liquids and a secondary waste reservoir operably connected to the primary waste reservoir to receive substantially liquid waste having suspended solids therein and includes biological decomposing enhancing media for enhancingly biodegrading the received waste rendering a second phase separation of solids and liquids.

A solids processor is operably connected to at least one of the primary waste reservoir and the secondary waste reservoir to receive solids waste therefrom in a manner to permit combustion of a substantial part the solids and generate a resultant waste, ash and gas and liquid processor is also operably connected to the secondary waste reservoir to receive a resultant liquid waste and treat the resultant liquid waste in a manner to render an environmentally safe water. The device further includes a gas processor operably interconnecting the solids processor and primary waste reservoir to treat the gas in a manner to render a resultant environmentally acceptable air.

A method for treating human waste is also provided. The method includes the steps of feeding human waste into a primary waste reservoir having media for enhancingly biodegrading the waste rendering a first phase separation of solids and liquids and transferring a portion of said first phase liquids and solids into a secondary waste reservoir having media for enhancingly biodegrading the received waste rendering a second phase separation of solids and liquids.

The method further includes elevating temperature of the waste to cause combustion of solids waste thereby splitting the resultant into a gaseous biproduct, ash and an aqueous biproduct having small concentrate particulate waste, and passing the resulting aqueous and gaseous biproduct back through the waste of the primary waste reservoir to be intermingled with the waste therein to remove odor from the gaseous biproduct. The method also includes treating the liquids from the second phase to substantially remove contaminants therefrom.

Other objects and advantages will be readily apparent to those skilled in the art upon viewing the drawings and reading the detailed description hereafter.

BRIEF DESCRIPTION OF THE DRAWINGS

FIG. 6 is an elevational schematic view of another embodiment of the present invention.

FIG. 7 is an elevational schematic view of a part of another embodiment of the present invention.

DETAILED DESCRIPTION OF THE INVENTION

Figure 1:
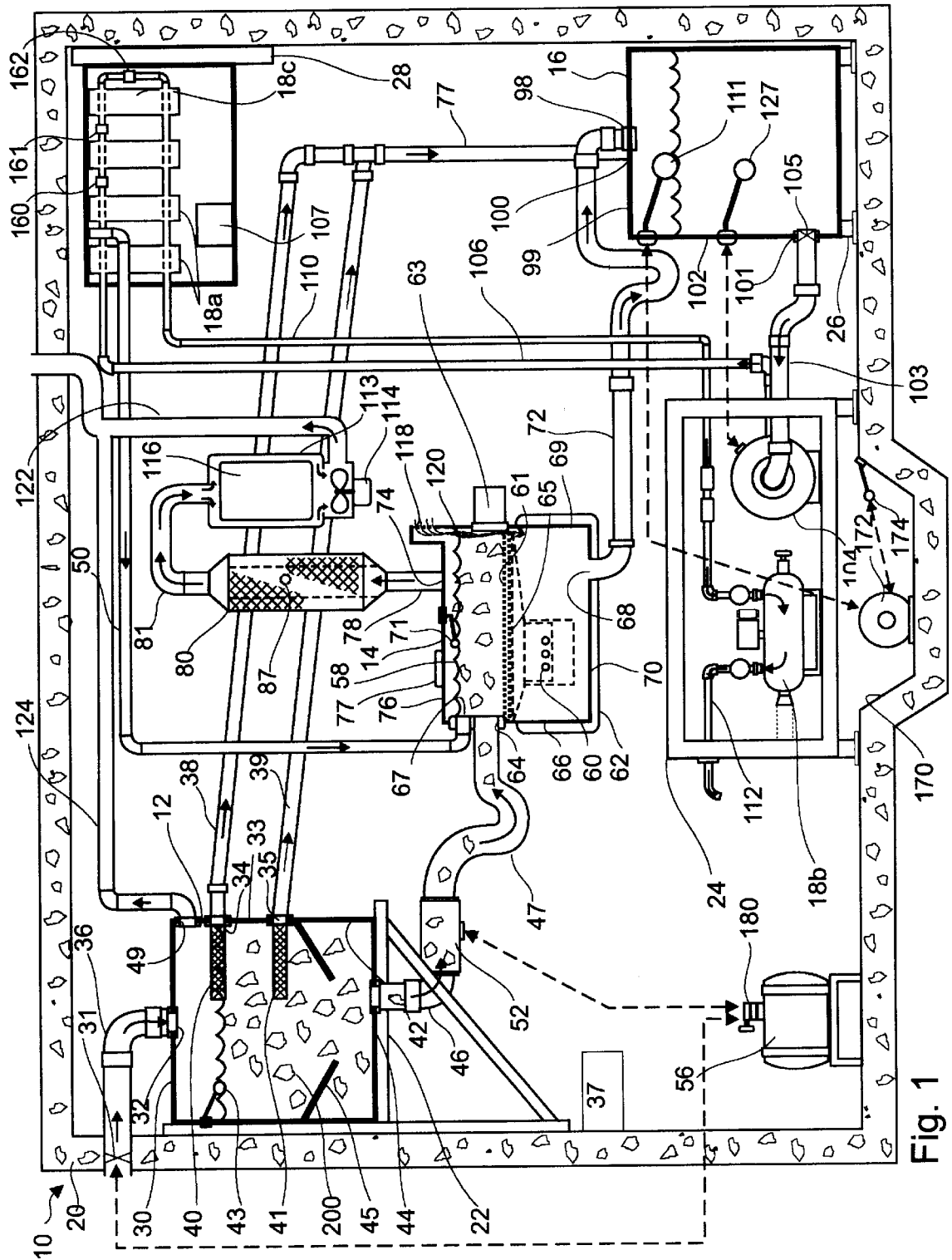
FIGS. 1 and 2 are elevational schematic views of embodiments of the present invention.
Figure 2:
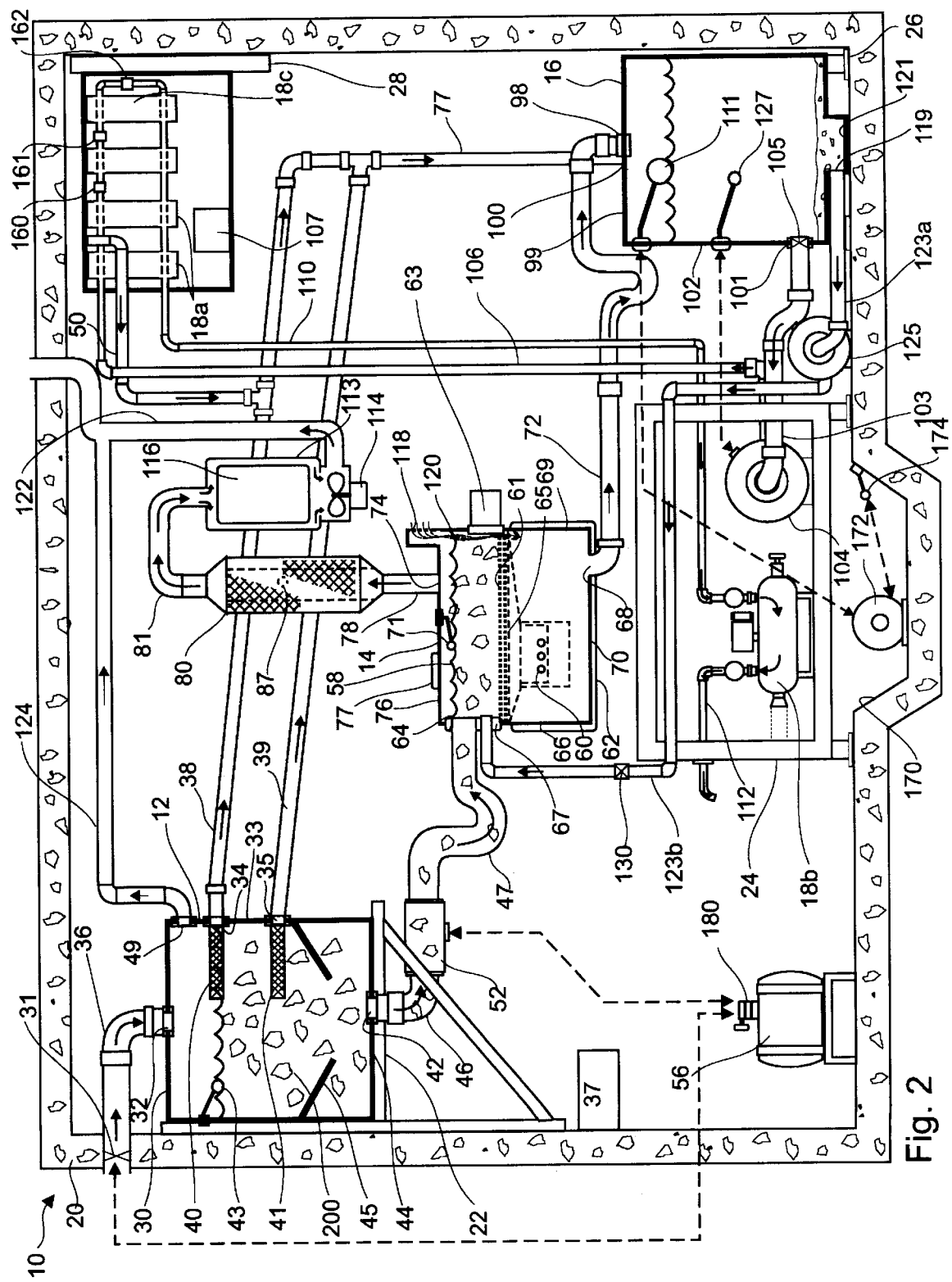
Figure 4:
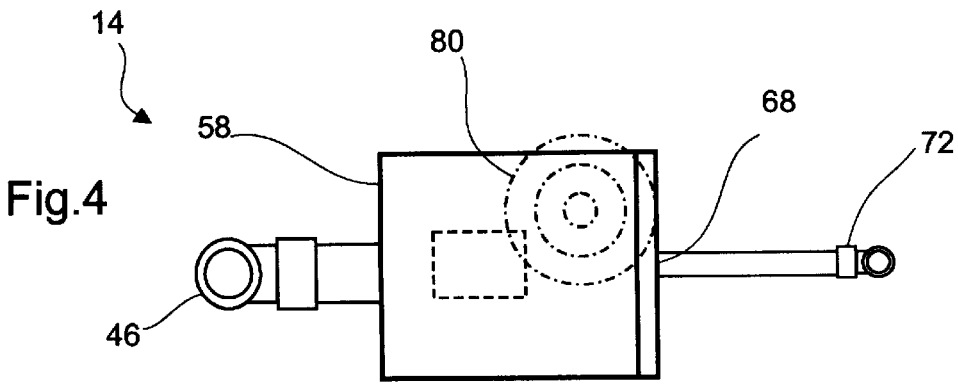
FIG. 4 is an elevational view of a part of the present invention components to a computer based system.

Referring now to the figures, as best shown in FIGS. 1, 2 and 4, a waste treatment device of the present invention is generally designated by the numeral 10. The waste treatment device 10 generally includes a primary waste reservoir 12 for receiving mixed solid and aqueous waste 200 of the human or animal type, a solids-gas processor 14 operably connected to the primary waste reservoir 12, a secondary waste reservoir 16 operably connected to the solids-gas processor 14 and the primary waste reservoir 12 and liquid processor 18a, 18b, 18c operably connected to the secondary waste reservoir 16. In the embodiment of FIG. 1, the secondary waste reservoir 16 is operably connected to the liquid processor 18. FIG. 2 shows the liquid processor 18 operably connected to the solid-gas processor 14. The waste treatment device 10 is preferably housed in a subterranean structure 20 preferably made of fiberglass or a like suitable material.

More particularly, the structure 20 is generally rectangular and has connected thereto a plurality of support structures 22, 24, 26 and 28. Support structure 22 supportively connects the primary waste reservoir 12. Support structure 24 supportively connects both the solids-gas processor 14 and liquid processor device 18b. The support structure 26 supportively connects the secondary waste reservoir 16 and structure 28 supportively connects liquid processor 18a and 18c. The particular orientation of the above described is set forth by way of example and is not intended to be limiting in the scope of the invention.

The primary waste reservoir 12 includes a sealable lid 30 having an open surface 32. A sewage inlet conduit 36 sealingly connects to the open surface 32 in a manner to permit fluid communication from the sewage inlet conduit 36 to the primary waste reservoir 12. A primary solenoid valve 31 is operably disposed in the inlet conduit 36 and connected to a compressor 56 which is controlled by a computer based system 37 more particularly described hereinafter.

A side 33 of the primary waste reservoir 12 has open surfaces 34 and 35, wherein the open surface 34 is adjacent the lid 30 and the open surface 35 is further laterally displaced from the lid 30. An overflow conduit 38 sealingly connects to the open surface 34 in a manner to permit fluid communication from the waste reservoir 12 to the overflow conduit 38 and secondary waste reservoir 16. Another fluid removal conduit 39 sealingly connects to the open surface 35 in a manner to permit regular fluid flow from the primary waste reservoir 12 to the conduit 39 and in turn thus preferably removing liquid before increased dissolved solids form therein. Solids retention screens 40 and 41 are operatively connected adjacent the open surfaces 34 and 35, respectively in a manner to block solids from passing into the conduits 38 and 39, respectively. Baffles 45 are mounted in the primary waste reservoir 12 to direct and retain solids adjacent a bottom 44 of the primary waste reservoir 12. The primary waste reservoir 12 also includes a float switch 43 operably connected to the computer based system 37 as will be further described hereinafter.

The side 33 has another open surface 42 in the bottom 44. An outflow conduit 46 sealingly connects to the open surface 42 in a manner to permit waste 200 to flow from the primary waste reservoir 12 to the outflow conduit 46. The conduit 46 includes a trap 47 to prevent gases from moving back toward the primary waste reservoir 12. Open surface 49 is formed in the side 33 to which a vent line 124 connects.

A solenoid valve 52 is disposed in the conduit 46 and controlled by computer based system 37. The outflow conduit 46 is operatively connected to the compressor 56 which is controlled by the computer-based system 37.

Within the solids-gas processor 14 is an incineration chamber 58 which includes a burner coil 60, a ceramic porous plate 61 and lava rock 62 disposed adjacent one another. The ceramic porous plate 61 is supported by a support frame 65. A microwave device 63 which includes a magnetron mica shield, magnetron blower and cooling fan, transformer and power conditioning components is operatively disposed to the incineration chamber 58 and connected to the computer based system 37. A temperature sensor 77 is operatively disposed within the incineration chamber 58 and connected to the computer based system 37. The cooling fan keeps the magnetron from overheating. A thermal switch is installed on the magnetron and prevents overheating and will turn off the magnetron when it reaches a preset temperature, e.g., 280 F. The switch will automatically reset itself once the temperature of the magnetron falls below another preset temperature e.g., 245 F. The incineration chamber 58 is likewise controlled by the computer-based system 37 as later herein described.

Open surface 64 and 67 are defined within an upper portion of side 66 of the incineration chamber 58. Another end of the outflow conduit 46 sealingly connects to the open surface 64 in a manner to permit waste to flow from the outflow conduit 46 to the incineration chamber 58. An open surface 68 is defined in a portion of a bottom 70 of the incineration chamber 58 to which one end of a conduit 72 sealingly connects to permit fluid flow thereto. A float switch mechanism 71 is operably disposed in an upper portion of the incineration chamber 58 and operably connected to the computer-based system 37 as further described hereinafter.

A vented portion 118 is provided in the incineration chamber 58 to permit air intake 120 therein. The vented portion 118 is adjacent and above the microwave device 63 and is of a size and shape to effectively contribute the amount of combustion air which is required in the incineration process. Also, this permits air flow continuously past the magnetron mica shield (window) which protects the magnetron by providing a cleaning action. The vented portion 118 also creates a slight vacuum during the processing which draws against other interfaces such of the chamber 58 to eliminate leakage of steam and smoke.

Figure 5:
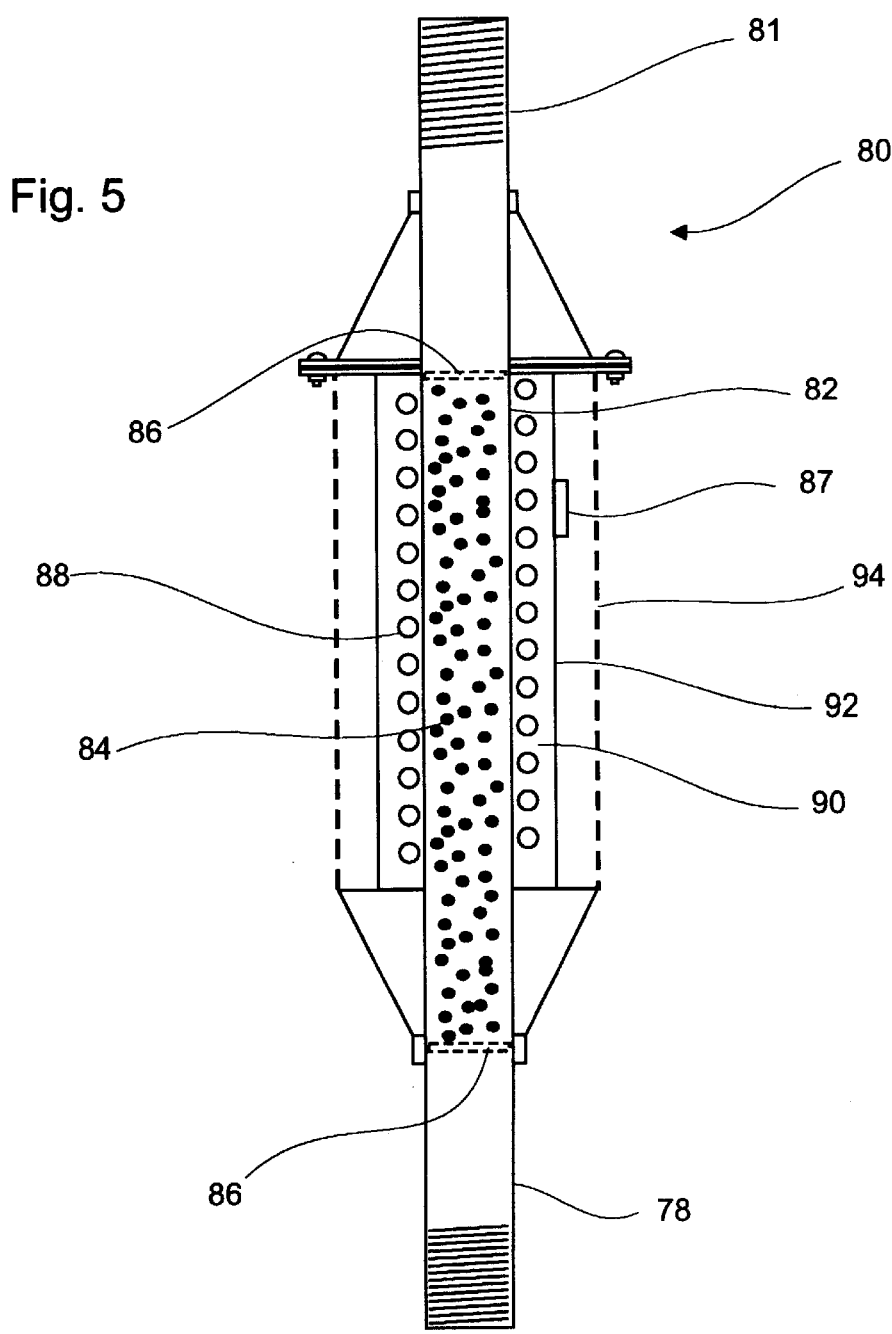
FIG. 5 is a top sectional view of a part of the present invention.

Another open surface 74 is defined in a top 76 of the incineration chamber 58. An end of an exhaust pipe 78 sealingly connects the open surface 74. Another end of the exhaust pipe 78 sealingly connects to a one end of a catalytic converter 80 of the processor 14, the particulars of which are best seen in FIG. 5. Another end of the catalytic converter 80 connects to a conduit 81 which in turn connects to a generally cylindrical annular heat exchanger 113.

The heat exchanger 113 has an air pocket 116 in its central region about which treated and cleaned air from the catalytic converter 80 moves. The heat exchanger 113 includes a power driven fan 114 to draw the cleaned air through the exchanger 113. An exhaust conduit 122 connects to another end of the heat exchanger 113 and extends outside the structure 20 to vent the cleaned air to above ground. The vent line 124 connects to the exhaust conduit 122 prior to exiting the structure 20.

The catalytic converter 80 includes a generally annular chamber 82 which has operatively disposed therein a plurality of catalytic conversion particles or pellets 84 which are retained by retention screens 86. The chamber 82 is preferably stainless steel and the pellets 84 are preferably platinum coated and found to be highly suitable for removing contaminants from gases passing therethrough. It has been found that preheating the platinum coated pellets 84 a predetermined amount of between about 700 and 1200 Fahrenheit provides enhanced performance and exhausts air into the environment which has been substantially decontaminated. This enhanced performance was not heretofore known. Operatively disposed in an encircling manner about the chamber 82 is an electrical heating coil 88 which is operatively connected to the electrical supply and computer based system 37. A temperature sensor 87 is operatively disposed in the converter 80 and connected to the computer based system 37. A generally annular heat conductive sleeve 90, preferably made of ceramic fiber, substantially encases the coil 88 and chamber 82. A retaining jacket 92, preferably made of stainless steel, houses the sleeve 90, coil 88, chamber 82 pellets 84 and screens 86. A generally annular shaped heat shield 94, preferably made of a perforated stainless steel, is of a size and configuration to substantially extend about the retaining jacket 92 in an interconnected manner such that the shield 94 is annularly spaced from the retaining jacket 92. In this way, cool air circulation is permitted about and between the retaining jacket 92 and the shield 94.

The catalytic converter 80 is located on top of the processor 14 where the exhaust gases exit the processor 14. The catalytic converter 80 will remove minute particles and odors from the exhausted byproduct. The heat exchanger fan 114 will aid in this process by creating a suction and directing the air flow through exhaust conduits 81 and 122.

The secondary waste reservoir 16 has an open surface 98 in its top side 99 to which a conduit 72 connects to permit a resultant waste to flow from the incineration chamber 58. Another open surface 100 is defined in the top side 99 to which an end of conduit 77 is sealingly connected in a manner to permit fluid flow into the secondary waste reservoir 16. Another end of the conduits 38 and 39 sealingly connect to the conduit 77 in a manner to permit fluid flow into the conduit 77 and in turn the secondary waste reservoir 16 from the primary waste reservoir 12. Another open surface 101 is defined in a side 102 to which an end of conduit 103 is sealingly connected in a manner to permit fluid flow from the secondary waste reservoir 16 to the liquid processor 18.

Still another open surface 119 is formed in a bottom 121 of the secondary waste reservoir 16. A conduit 123a is sealingly connected to open surface 119 and pump 125. Another conduit 123b sealingly interconnects to open surface 67 and pump 125. Pump 125 is operatively connected to computer based device 37.

The secondary waste reservoir 16 has two piggyback mechanical float switches 111 and 127 which will provide three levels of indications, "Low, High, and High High," to the computer-based device 37. The float switch 127 is operably connected to the computer based device 37 which controls the pump 104 and also direct wired to the pump 104. Another end of the conduit 103 is sealingly connected to an inlet of a pump 104. Pump 104 is operatively connected to the computer based system 37 which is triggered by the float switch 127 reaching a predetermined height. An end of conduit 106 is sealingly connected to an outlet of pump 104. The computer based device 37 controls the pump 125 as seen in FIG. 2 such that the pump 125 is activated at a predetermined time of each day, preferably after the float switch 127 has moved to the low position.

Another end of conduit 106 is sealingly connected to an inlet of liquid processor 18a. The liquid processor 18a including membrane filters, such as an ultrafilter, and 18c including a carbon filters, which are arranged in series so that the incoming fluid sequentially travels through the filters 18a and 18c. As seen in FIG. 2, another end of backflow conduit 50 is sealingly connected to the liquid processor 18a and 18c in a manner to permit suspended aqueous/solids or concentrate to flow back to the secondary waste reservoir 16 via a connection between conduit 50 and conduit 38.

An end of a return conduit 110 is sealingly connected to the liquid processor 18a and 18c in a manner to permit filtered fluid flow therefrom. Another end of a return conduit 110 is sealingly connected to the liquid processor 18b in a manner to permit the membrane filtered fluid flow therethrough. The purification device 18b is a UV light treatment device which rids the filtered water of remaining biological contaminants. Another outflow line 112 is sealingly connected to the liquid processor 18b in a manner to permit irradiated filtered fluid (substantially clean water) to flow from the liquid processor 18b.

In general, the operation of device 10 is as follows. The waste 200 includes both solids and liquids and is controllably gravity fed to the primary waste reservoir 12. The waste 200 is preferably substantially separated in the primary waste reservoir 12 in a manner to substantially direct solids away from entering the secondary waste reservoir 16 and such that the solids are controllably fed into the incineration chamber 58. Liquids including dissolved solids and some minor suspended solids are permitted to pass through the ceramic plate 61.

After substantially all fluid has drained out of the incineration chamber 58 and upon the waste level reaching a predetermined level in the incineration chamber 58, incineration begins. The heating coil 60, lava rock 62, ceramic porous plate 61 and microwave device 63 are employed to sufficiently elevate the temperature of the waste to cause combustion thereof resulting in gaseous and ash biproduct. Gaseous biproducts are catalytically treated to remove contaminants using the catalytic converter 80. Ash is controllably fed into the secondary waste reservoir 16 with other waste fluids from the primary waste reservoir 12 via conduit 38. Such waste fluids are purified by way of membrane filtration and irradiation to provide resultant clean water using the filters 18a and 18c and the UV light treatment device 18b.

The computer-based device 37 consists of a miniature programmable controller and includes a CPU, RAM, hard disk and communications link, such as a modem. The computer-based device 37 will preferably transmit one of two types of alarms: level-1—wherein the computer-based device 37 will shut down the device via closing the primary valve 31 and signaling an immediate need of service; and level-2—wherein the computer-based device 37 permits use of the device 10 and signals a need for service within a reasonable period of time.

Figure 3:
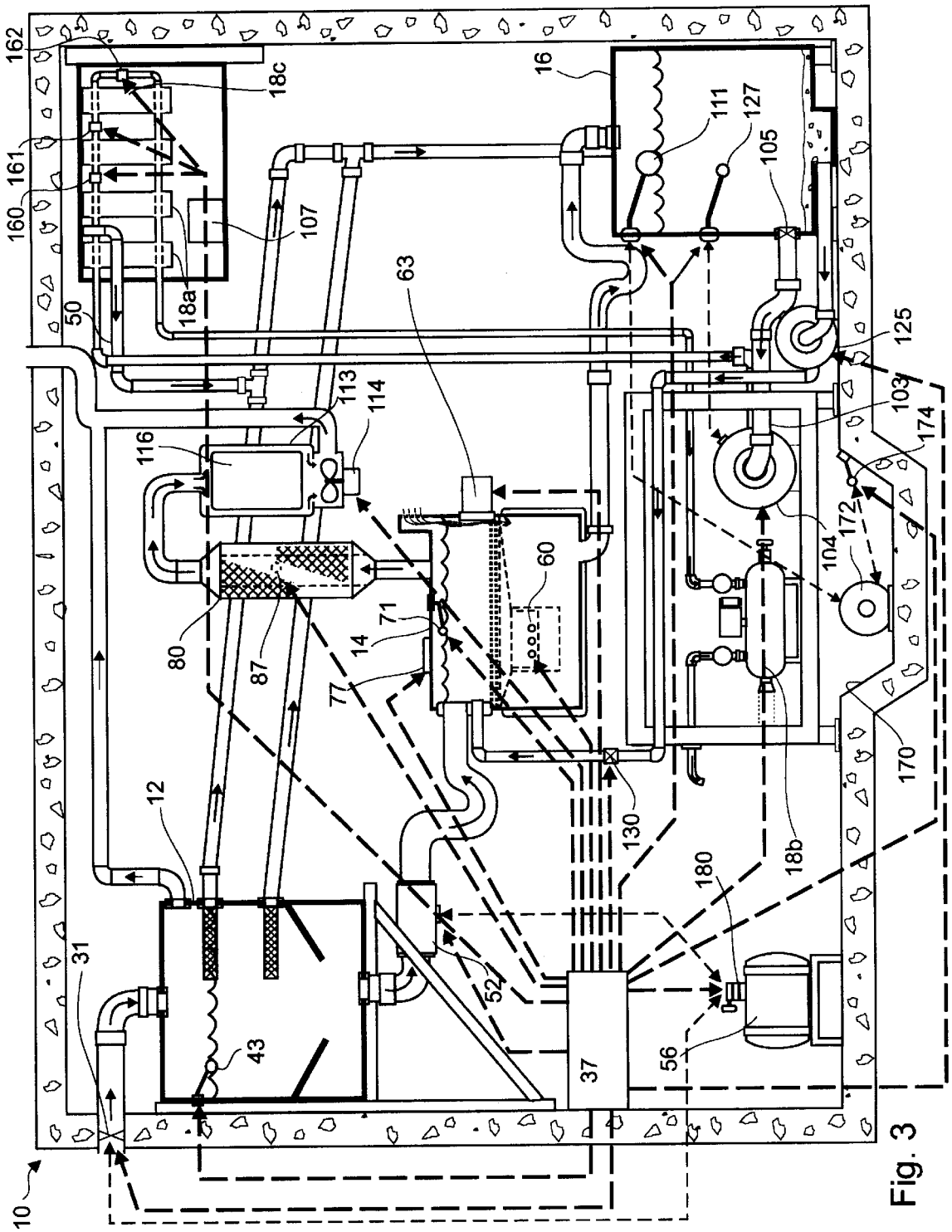
FIG. 3 is a schematic view showing electrical connections of the present invention.

The computer-based device 37 will control and monitor the device 10 as shown in FIG. 3. All indications and alarms will be logged with extensive data collection for recording performance data and reported back to the remote site as earlier described. The computer-based device 37 will have communications software and can be remotely queried and reprogrammed via the modem. Also, software will be resident for controlling the operations of the device 10 as described herein.

The solenoid valve 31 is an actuated valve controlled by computer-based device 37 which allows the raw sewage from the house or source to flow into the primary waste reservoir 12. The valve 31 has a limit switch installed to provide "open" and "closed" indication to the computer-based device 37. When the valve 31 is neither in an open or closed state and after it has been requested to be open or closed for a predetermined period, 2 seconds, for example, the computer-based device 37 will indicate a malfunction. This malfunction is indicated via sounding an alarm and/or displaying a signal such as "Primary Inlet Solenoid Valve Failed To Open" and "Primary Inlet Solenoid Valve Failed To Close," respectively and/or transmitting a signal to a remote site for receipt thereof by a remotely located attendant. This will be a level 1 alarm resulting in shutting down the system. The computer-based device 37 is equipped with software and hardware for transmitting to a remote site the alarm status via modems and telephone lines, for example.

As the primary waste reservoir 12 fills, solids will settle to the bottom 22 of the primary waste reservoir 12 with the aid of baffles 45 while grease and other lighter dissolved and suspended solids will substantially remain at the top. The float switch 43 will provide two levels of indications, "Low" and "High High" to the computer based device 37. "Low" level will serve as an inactive status indication and "High High" level will be a Level-1 alarm. At "High High" level, the waste will be above the overflow level and the computer-based device 37 will command the solenoid valve 31 to close via the compressor 56. When the alarm conditions clear, the computer-based device 37 will command the solenoid valve 31 to open.

The solenoid valve 52 allows the waste 200 from the primary waste reservoir 12 to flow to the incineration chamber 58. The valve 52 will be controlled by the computer-based device 37 using software which monitors the drain rate of the waste and the "Hi" and "Low" level status of the float switch 71 in the incineration chamber 58.

When the waste reaches the "Hi" level in the incineration chamber 58, the computer-based device 37 will close the outgoing valve 52 via the compressor 56. When the level reaches the "Low" level and the drain rate is equal or less than a predetermined rate in which the float switch 71 moves from high to low positions or predetermined time (e.g., 15 minutes), the computer-based device 37 will open the solenoid valve 52. If the drain rate or the time it takes the fluid in the incineration chamber 58 to drain from "Hi" to "Low" level, exceeds the predetermined rate or time, a signal is generated which indicates that there exist solids which inhibit flow in the incineration chamber 58. The computer-based device 37 will keep the solenoid valve 52 closed and initiate a "Demand" combustion cycle in the processor 14. If the conditions remain the same, a level 1 alarm signal will be generated by computer-based device 37 as previously described.

The solenoid valves 52 and 130 will have a limit switch installed to provide "open" and "closed" indications. When either of the solenoid valves 52 and 130 is neither in an open or closed state, after they have been commanded to be open or closed, respectively, for a predetermined time (e.g., 2 seconds), an alarm will occur, "Valve Failure to Open" or "Valve Failure to Close," respectively. This will be a level 1 alarm and the computer-based device 37 will close the solenoid valve 31.

A temperature sensor 87 in the catalytic converter 80 is operatively connected to the computer-based device 37. When a "Demand" burn cycle is initiated, the computer-based device 37 will command the catalytic converter 80 heating coil 88 to turn on. When the temperature in the catalytic converter 80 reaches a predetermined temperature (e.g., 300 F), the computer-based device 37 will command the heat exchanger fan 114, the magnetron cooling fan and the magnetron to turn on. After a predetermined period (e.g., 5 minutes), the heating coil 60 is turned on. When the temperature in the incineration chamber 58 has reached the predetermined temperature (300 F.), the computer-based device 37 will command the catalytic converter heating coil 88 to turn off.

The computer-based device 37 will cause the heat exchanger fan 114 to turn on at the beginning of the combustion process within the processor 14 and will remain on until the incineration chamber 58 completes its process and has cooled down to another predetermined temperature (e.g., 200 F.). Once the cool down has been achieved, the computer-based device 37 will command the heat exchanger fan 114 to turn off. The cool down temperature will be sensed and determined by a temperature sensor 77 (thermocouple) in the incineration chamber 58 which is operably connected to the computer-based device 37.

The temperature sensor 87 in the catalytic converter 80 will also provide a means for the computer-based device 37 to determine if the catalytic converter 80 and the heat exchanger fan 114 are on or off. If after a predetermined period (e.g., 5 minutes) the temperature does not increase when the catalytic converter 80 is turned on, the computer-based device 37 will generate an alarm, "Catalytic Converter Fail to turn On" and transmit a signal to the remote site as previously described. If after a predetermined period (e.g., 5 minutes) the temperature does not decrease a predetermined amount when the heat exchanger fan 114 is on, the computer-based device 37 will alarm, "Heat Exchange Fan Failed to turn On" and transmit a signal to the remote site as previously described. In either case, this is characterized as a "Level 2" alarm which does not necessitate shutting down the device 10.

The float switch 71 is made of stainless steel, for example, and will provide "Hi" and "Low" level indications to the computer-based device 37. When the level is "Low" and the drain rate or the time it takes the fluid in the incineration chamber 58 to drain from "Hi" to "Lo" level, is acceptable, the computer-based device 37 will command the solenoid valve 52 to open. When the drain rate or time is unacceptable (e.g., 30 minutes), the computer-based device 37 will command the incineration chamber 58 to begin a combustion cycle on "Demand".

The temperature sensor 77 will measure the temperature rise due to the magnetron of the microwave device 63 and the heating element 60. At the beginning of the combustion process and after the catalytic converter 80 has reached the predetermined temperature (300 F.), the computer-based device 37 will command the heat exchanger fan 114, the magnetron and the cooling fan of the microwave device 63 to turn on. If within 5 minutes the temperature in the processor 14 does not increase, the computer-based device 37 will alarm, "Magnetron Failed to turn On." If the temperature does increase, the computer-based device 37 will turn on the heating element 60. The temperature should increase rapidly indicating the heating element 60 is on. If not, the computer-based device 37 will alarm, "Heating Element Failed to turn On." Both the magnetron of the microwave 63 and heating element 60 will remain on until the temperature in the incineration chamber 58 reaches the predetermined time and temperature combination which assures complete combustion of the waste 200. Typically, a complete combustion may take up to 1 hour or until a temperature of 1100 F. for 15 minutes. If after a 1 hour burn the temperature has not reached 850 F., the computer-based device 37 will alarm with an "Incomplete Combustion" alarm. This would be a level 2 alarm. Should this incomplete burn occur again on the next demand burn, the computer-based device 37 will then alarm with a level 1 alarm as described above. When the burn process cycle is complete, the exhaust fan will 114 remain on until the temperature in the incineration chamber 58 has fallen below 200 F. Once this has been achieved, the computer-based device 37 will open the solenoid valve 52.

If there is no combustion in a 24 hour period and the solenoid valve 52 has cycled at least once, the computer-based device 37 will commence a burn cycle at predetermined time of the day, 1:00 a.m. for example. If the solenoid valve 52 has not cycled in a 24 hour period, it is assumed that no use has occurred and no combustion is necessary.

The secondary waste reservoir 16 accepts liquid and certain dissolved and suspended solids waste from the primary waste reservoir 12 as described above from the conduits 38, 39 and 50 and also from the incineration chamber 58 via conduit 72. Switch 127 will provide a signal of "Low" which will initiate the computer-based device 37 to stop the pump 104. Switch 127 provides "High" and "High High" signals which will initiate the computer-based device 37 to start the pump 104. At the "High High" level, switch 111 will cause the computer-based device 37 to send a level 2 alarm and initiate the sump pump 172. After a predetermined time, e.g., 15 minutes, the computer-based device 37 to send a level 1 alarm "Secondary Waste Reservoir Overflow," to the remote site as described above that maintenance is required immediately and cause the valve 31 to close. The solenoid valve 52 will remain operative based on the incineration chamber float switch 71.

The pump 104 pumps the water from the secondary waste reservoir 16 through the filtration membranes 18a and carbon filters 18c will trap any impurities larger than a predetermined size (5 microns) and return them to the secondary waste reservoir 16 as shown in FIG. 1 (or to the incineration chamber 58 as in FIG. 2). The filtered liquid flows through UV device 18b.

The filtration pump 104 will be controlled by the computer-based device 37. When the level on the secondary waste reservoir 16 is "Low," the pump 104 will turn off. When the level is "High," the computer-based device 37 will command the filtration pump 104 to be turned on. If the level does not decrease in a predetermined time, e.g., 8 minutes, the computer-based device 37 will alarm with a level 2, "Filtration Pump Fail to Run." If the water level continues to rise to the "High High" level, the computer-based device 37 will alarm with a level 1, "Secondary Waste Reservoir Overflow." This could mean that the filtration pump 104 is not working or that it cannot handle the increase overflow and the device 10 will shut down.

When the water level in the secondary waste reservoir 16 reaches "High" level, the filtration pump 104 will turn on and circulate through the filters 18a and 18c.

There are three pressure transducers 160, 161 and 162 with a 0 to 100 psi range. One pressure transducer 161 is installed on the inlet to the carbon filters 18c, another pressure transducer 162 on an outlet, and another 160 on an outlet of the filters 18a. Depending on the configuration of the filters 18a and 18c, the pressure transducers 161 and 162 permit the computer-based device 37 to calculate the difference between the inlet and outlet pressures. If the differential pressure exceeds a predetermined pressure (e.g., 20 psi), the computer-based device 37 will alarm and indicate which filter is clogged. This is a level 2 alarm.

A sump 170 and a sump pump 172 installed in the structure 20 to catch any run-offs, leakage, and overflows from the device 10. The sump pump 172 will automatically turn on via internal level switch 174 which is wired into the computer-based device 37 for alarm indication, "Vault High Water." The sump pump 172 moves the overflow to a predetermined site, such as a conventional to sewage disposal system. The "Vault High Water" alarm will not be an immediate level 1 alarm. It will be a level 2 alarm for a predetermined period (e.g., 30 minutes) before converting to a level 1 alarm.

The air compressor 56 supplies air to the valves 31, 52 and 130. There is a pressure switch 180 located on the air compressor 56 which will be wired into the computer-based device 37 for indication. The pressure switch 180 will activate the compressor 56 to turn on. When this happens, the computer-based device 37 will keep track the number of times the valves are activated until the next time the compressor 56 is turned on again. An average will be calculated by the computer-based device 37, valve cycles per compressor operation. The computer-based device 37 will use this average to monitor the performance of the air compressor 56. Should the air compressor 56 begin to leak, the valve cycles per compressor operation would decrease indicating reduced efficiency. When the efficiency has been reduced below an acceptable level, e.g., 20%, the computer-based device 37 would then alarm, "Air Compressor is Leaking." This is only a level 2 alarm.

Should power failure occur, the computer-based device 37 will record the last state of events and keep a running time of the power failure duration. When power is returned, the computer-based device 37 will continue the process as before. The only exception to this rule is during a combustion cycle.

When a combustion cycle is in process and power failure occurs, the computer-based device 37 will note the last temperature of the combustion cycle. If the temperature in the incineration chamber 58 was less than 1000 F., the computer-based device 37 will re-start the combustion cycle as soon as power is restored. The computer-based device 37 will turn on the exhaust fan 114 and purge the incineration chamber 58 for 2 minutes. Once the purging is complete, the computer-based device 37 will turn on the catalytic converter 80. When the temperature in the catalytic converter 80 has reached 300 F., the computer-based device 37 will turn on the exhaust fan 114, magnetron, and, 5 minutes later, the heating coil 60. When the temperature in the incineration chamber 58 has reached combustion temperature, e.g., 300 F., the computer-based device 37 will turn off the catalytic converter 80 and continue the burn process.

If the temperature in the incineration chamber 58 was equal or greater than 1000 F. when power failure occurred, the computer-based device 37 will treat the process as having been completed and will continue the process on "Demand" as soon as power is restored.

Referring now to the FIGS. 6–7, another embodiment of the waste treatment device of the present invention is generally designated by the numeral 10'. The waste treatment device 10' generally includes a primary waste reservoir 112' including received mixed solid and aqueous waste 200' of the human or animal type, a secondary waste reservoir 114' communicably connected to the primary waste reservoir 112', a solids-gas processor 116' operably connected to the primary waste reservoir 112', and liquid processor 118' operably connected to the secondary waste reservoir 114'. The reservoirs 112' and 114' and processor 116' could be formed in a single tank as opposed to separate tanks. The waste treatment device 10' is housed in a subterranean structures 120a', 120b', 120c' and above ground structure 120d' which are preferably made of fiberglass or a like suitable material. Structures 120a' and 120b' are generally mirrored in configuration about a dividing wall 121' with structure 120b' being slightly lower in relation to structure 120a'. The wall 121' may also be provided with a plurality of open surfaces 221' which permit waste to be communicated therethrough. In the case of a single tank, fluid and waste flow occurs through open surfaces 221', wherein the secondary waste reservoir 114' accepts liquid and certain dissolved and suspended solids waste from the tanks, the waste flows through conduit 140'.

More particularly, the structure 120a' has a plurality of access ports 122a' with associate lids 124a'. The structure includes a dividing wall 123a' which extends from a bottom 125a' upward therefrom a predetermined length forming two compartments 127a' and 129a', wherein fluid communication is permitted between compartments 127a' and 129a' over dividing wall 123a' through open surfaces 223a'. A pump 131'a is disposed on the bottom 125a' in compartment 127a' and an aeration manifold 133a' is operably disposed adjacent the bottom 125a' in compartment 129a'. Additionally, biomedia 139a' is operably disposed in compartment 129a'. Biomedia 139a' and 139b' are generally cylindrical in configuration with ribbed surfaces to enhance microbial growth and has a diameter of about 3.5 inches. The biomedia 139a' and 139b' are made of a polymer, such as polyethylene or polypropylene. The biomedia 139a' and 139b' described are by way of example, and it is contemplated that other forms of biomedia may be used in place or in conjunction with that shown in the present embodiment. The biomedia 139a' which is disposed in compartment 129a' will serve to primarily enhance biodegradation of organic waste.

Structure 120b' is similarly formed with access ports 122b', lids 124b', dividing wall 123b' having open surfaces 223b' therein to permit transport through to compartment 129b'. Structure 120c' includes an access port 122c' and lid 124c'. Manifolds 133b' and biomedia 139b' are disposed in the compartment 127b' for purposes of aiding in nitrification described hereinafter. The particular orientation of the above described is set forth by way of example and is not intended to be limiting in the scope of the invention.

The structure 120a' has open surfaces 134a', 135a', 136a', 137a' and 138a' are formed in the structure 120a'. The structure 120b' has open surfaces 132b',134b', 135b', and 136b' are formed therein. The open surfaces 134a' and 134b' are interconnected by an overflow conduit 140'. The open junction surface 132a' connects to a conduit 195a' which terminates adjacent the bottom 125a' and serves as an influent opening for untreated waste 200' and open surface 132b' serves as an effluent opening for treated waste 200'.

Within the structure 120d' is the solids-gas processor 116' and includes an incineration chamber 158' which includes a burner coil 160' and perforated stainless steel shelf filter 162' disposed adjacent one another. A microwave device 163' which includes a magnetron quartz shield, magnetron cooling fan, transformer and power conditioning components is operatively disposed to the incineration chamber 158' and connected to a computer based device 237' and/or time control device 240' which are operative in a similar manner as described above for computer based device 237'. A temperature sensor 177' is operatively disposed within the incineration chamber 158' and connected to the computer based device 237'. The cooling fan keeps the magnetron from overheating. A thermal switch is installed on the magnetron and prevents overheating and will turn off the magnetron when it reaches a preset temperature, e.g., 280 F. The switch will automatically reset itself once the temperature of the magnetron falls below another preset temperature e.g., 245 F.

Open surface 164' and 167' are defined within the incineration chamber 158'. A conduit 146' connects to the pump 131a' and extends through open surface 138a' and connects to the open surface 164' in a manner to permit waste to flow from the primary waste reservoir 112' to the incineration chamber 158'. An open surface 168' is defined in a portion of a bottom 170' of the incineration chamber 158' to which one end of a conduit 172' sealingly connects and has an another end extending through the open surface 137a' and is preferably terminated above the waste 200' to permit fluid flow back to the primary waste reservoir 112'. A float switch mechanism 171' is operably disposed in an upper portion of the incineration chamber 158' and operably connected to the computer-based system 237'. The incineration chamber 158' is likewise controlled by the computer-based device 237' wherein a burn cycle is determined as a function of the drain rate in the incineration chamber 158'. The computer based device 237' will initiate the pump 131a' after a predetermined period, say once a week, and determine whether a burn cycle is required per the drain rate.

A venting system 218' may be provided as attached to the incineration chamber 158' to facilitate directing exhaust flow as desired. The venting system 218' may be equipped with an electrical fan to enable intake and exhaust through the venting system 218'.

In one embodiment, the venting system 218' may contribute an amount of combustion air which is required in the incineration process and provides air flow across the magnetron quartz shield and waste through the conduit 172' to the primary waste reservoir 112' (intake/exhaust process). It is recognized that the air can be removed out of the incineration chamber 158' when pumping waste 200' from the primary waste reservoir 112'. Also, this would permit air flow continuously past the magnetron quartz shield (window) which protects the magnetron by providing a cleaning action.

An air compressor 180' is disposed with the structure 120d' and is operably connected to computer based device 237' and conduit 182'. The conduit 182' communicatively connects to the aeration manifolds 133a' and 133b'. Compressor 180' controllably supplies air to the primary and secondary waste reservoirs 112' and 114', respectively, in compartments 129a' and 127b', respectively, for purposes of aiding organic removal and nitrification as described herein.

A conduit 190' has an end extending through open surface 136a' of the primary waste reservoir 112a' and terminates in compartment 127a'. Another end of the conduit 190' extends through open surface 136b' of the secondary waste reservoir 114' and communicably connects to a pump 131b' which is disposed on a bottom 125b' of the secondary waste reservoir 120b' in compartment 129b'. The pump 131b' is operably connected to the computer based device 237'.

The structure 120c' includes a junction surface 132c' which is connected to a conduit 194'. Another conduit 195c' connects to the junction surface 132c' and terminates near a bottom portion 125c'. A liquid processor operably interconnects to the conduit 194' via conduit 118' to feed suitable disinfecting agents thereto. It is appreciated that the conduit 118' may include means for diverting flow from the conduit 194' to other liquid processing means as described herein and then redirecting the flow back to the line 194'. The structure 120c' also includes an access port 122c' and associated lid 124c'. A discharge device 196' is operably disposed adjacent an upper portion 198' of the structure 120c' to discharge substantially decontaminated effluent 201' to a leach field or the like. This structure assures adequate retention time of the liquids in the structure 120c' to disinfect.

The computer-based device 237' will control and monitor the device 10'. All indications and alarms will be logged with extensive data collection for recording performance data and reported back to the remote site as earlier described. The computer-based device 237' will have communications software and can be remotely queried and reprogrammed via a DTMF (touch tone device). Also, software will be resident for controlling the operations of the device 10' in a manner as previously described herein for device 10.

As the primary waste reservoir 112a' fills, solids will settle to the bottom 125a' of compartment 127a'. When the level reaches the height of the open surfaces 223a', primarily liquid and lighter dissolved and suspended solids will substantially remain at the top and will flow to compartment 129a' of the primary waste reservoir 112a'. In compartment 129a', the biomedia 139a' and aeration manifolds 133a' provide the suitable requirements for aiding in effective treatment of waste 200'.

At this point it is important to understand the principles by which the device 10' has enhanced the treatment process and device. The primary waste reservoir 112' and secondary waste reservoir 114' removes nitrogen using biological processes, such as ammonification followed by nitrification and denitrification. In ammonification, organic nitrogen (proteins and peptides) is decomposed to ammonia or ammonium during decomposition of waste 200'. The ammonification is followed by nitrification. The biomedia 139a' provide an enhanced environment for microbial activity and organic removal primarily occurs in the compartment 129a'. In nitrification, ammonia is removed biologically by a two-step process in which the ammonia is oxidized to nitrite, and the nitrite is oxidized to nitrate according to the following formulas.

$$NH_3 + O_2 + CO_2 + HCO_3^- + Microbes \rightarrow New\ Microbes + NO_2^- + H^+ + H_2O$$

$$NO_2^- + O_2 + CO_2 + HCO_3^- + Microbes \rightarrow New\ Microbes + NO_3^-$$

The nitrification primarily takes place in the compartment 127b' with aid of biomedia 139b' and is affected by temperature, pH, dissolved oxygen (DO), alkalinity, contact time, and mean cell residence time. The temperature and pH are not specifically controlled in the primary waste reservoir 112a' or secondary waste reservoir 114a'. The temperature is normally kept between 50 to 90 F. by the microbial activity and some added heat from the air compressor 180'. The pH is typically between 7 and 8.5 in the primary waste reservoir 112a', since no chemicals are added to either the primary waste reservoir 112a' or the secondary waste reservoir 114'. Therefore, both the temperature and the pH fall within the optimum range for the nitrification.

The air compressor 180' continuously supplies air to the compartments 129a' and 127b' to continuously to keep the dissolved oxygen level above 3 mg/l. The conversion of ammonia to nitrates requires oxygen to convert the same, preferably 4.57 kg of oxygen per kg of ammonia converted.

Nitrate formed during nitrification is removed by heterotrophic organisms (microbes) under anoxic conditions through conversion to gaseous nitrogen species through dentrification. In this process, nitrate first is reduced to nitrite and then to nitric oxide (NO), followed by nitrous oxide ($N_2O$) and nitrogen gas ($N_2$). This process requires a carbon source. The waste 200" exiting the two-stage aerobic compartments 129a' and 127b', which is high in nitrates and low in carbon, is recirculated back to the first anerobic compartment 127a' where it mixes with the untreated waste 200', which is high in carbon. Denitrification takes place primarily in the compartment 127a' via the nitrified effluent from 129b' to 127a'. Limited denitrification also takes place in 129b'.

The biodegradable organic carbon within the waste 200', that causes CBOD, is converted to carbon dioxide and settleable biomass by heterotrophic organisms (microbes). These microorganisms require oxygen. The process is referred to as aerobic digestion and can be expressed by the following equation.

Microbes $$Organic\ Matter + O_2 + Nutrients \rightarrow New\ Microbes + CO_2 + H_2O$$

Aerobic digestion takes place in the compartment 129a' which utilizes a combination of an attached and suspended growth process. There is an attached film growing on the biomedia 139' and the suspended growth is created by mixing and recirculation of sludge waste 200'. This combination results in a treatment efficiency that exceeds the individual performance of an attached or suspended growth process and provides a steady population of microorganisms.

The aerobic digestion of organic matter is mainly affected by dissolved oxygen, pH, temperature, mixing, and solids retention time. The design of the device 10' optimizes these parameters for maximum CBOD and nitrogen removal.

The float switch 43' will provide two levels of indications, "Low" and "High High" to the computer based device 237'. "Low" level will serve as an inactive status indication and "High High" level will be a Level-1 alarm. At "High High" level, the waste will be above the overflow level and the computer-based device 237' will command an audible and visual alarm (not shown) which is located in the dwelling and transmit service signal in a manner previously described.

As indicated the pump 131a' will move the waste 200' from the primary waste reservoir 112a' to flow to the incineration chamber 158'. The pump 131a' will be controlled by the computer-based device 237' using software which monitors the drain rate of the waste and the "Hi" and "Low" level status of the float switch 171' in the incineration chamber 158'. When the waste reaches the "Hi" level in the incineration chamber 158', the computer-based device 237' will turn off pump 131a'. When the level reaches the "Low" level and the drain rate is equal or less than a predetermined rate in which the float switch 171' moves from high to low positions or predetermined time (e.g., 5 minutes), the computer-based device 237' will turn on the pump 131a'.

If the drain rate or the time it takes the fluid in the incineration chamber 158' to drain from "Hi" to "Low" level, exceeds the predetermined rate or time, a signal is generated which indicates that there exist solids which inhibit flow in the incineration chamber 158'. The computer-based device 237' will keep the pump 131a' off and initiate a "Demand" combustion cycle in the processor 116'.

The operation of pump 131a' is monitored by the computer 237'. When the pump 131a' is turned on, the computer 237' monitors float switch 171' for a hi level signal. If a high level signal is not obtained within one minute of operation of pump 131a', a level 2 alarm "sludge pump failed to run" is generated.

The float switch 171' is made of stainless steel, for example, and will provide "Hi" and "Low" level indications to the computer-based device 237'. When the level is "Low" and the drain rate or the time it takes the fluid in the incineration chamber 158' to drain from "Hi" to "Lo" level, is acceptable, the computer-based device 237' will command to turn on the pump 131a'.

The temperature sensor 177' will measure the temperature rise due to the magnetron of the microwave device 163' and the heating element 160'. To begin a burn cycle, the microwave device 163' is activated. If within 5 minutes the temperature in the incineration chamber 158' does not increase, the computer-based device 237' will alarm, "Magnetron Failed to turn On." If the temperature does increase, the computer-based device 237' will turn on the heating element 160'. The temperature should increase rapidly indicating the heating element 160' is on. If not, the computer-based device 237' will alarm, "Heating Element Failed to turn On." Both the magnetron of the microwave 163' and heating element 160' will remain on until the temperature in the incineration chamber 158' reaches the predetermined time and temperature combination which assures complete combustion of the waste 200'. Combustion time and temperature are as previously described and computer based device 237' will act in a similar manner with alarms as indicated. When the burn process cycle is complete, the venting system 218' will remain on until the temperature in the incineration chamber 158' has fallen below 200 F. Once this has been achieved, the computer-based device 237' will turn off system 218'. If there is no combustion in a predetermined period, the computer-based device 237' will initiate the pump cycle the following week and check drain rates and the need for a burn cycle.

The air compressor 180' supplies air to the air manifolds 133'. There is a pressure switch 181' located on the air compressor 180' which is wired into the computer-based device 237' for indication. The pressure switch 181' monitors the output of compressor 180'. If the pressure drops indicating a failure of the compressor, pressure switch 181' notifies the computer 237'. This will create a level two alarm. (Note: the compressor 180' remains on).

Should power failure occur, the computer-based device 237' will record the last state of events and keep a running time of the power failure duration. When power is returned, the computer-based device 237' will continue the process as before. The only exception to this rule is during a combustion cycle which proceeds in a manner as described above.

It has been observed that the forced draft operation of the thermal processor allows the elimination of the catalytic converter and the heat exchanger by routing the exhaust gas into the liquid waste. The liquid waste scrubs the exhaust gas of soot and particulates.

Figure 8:
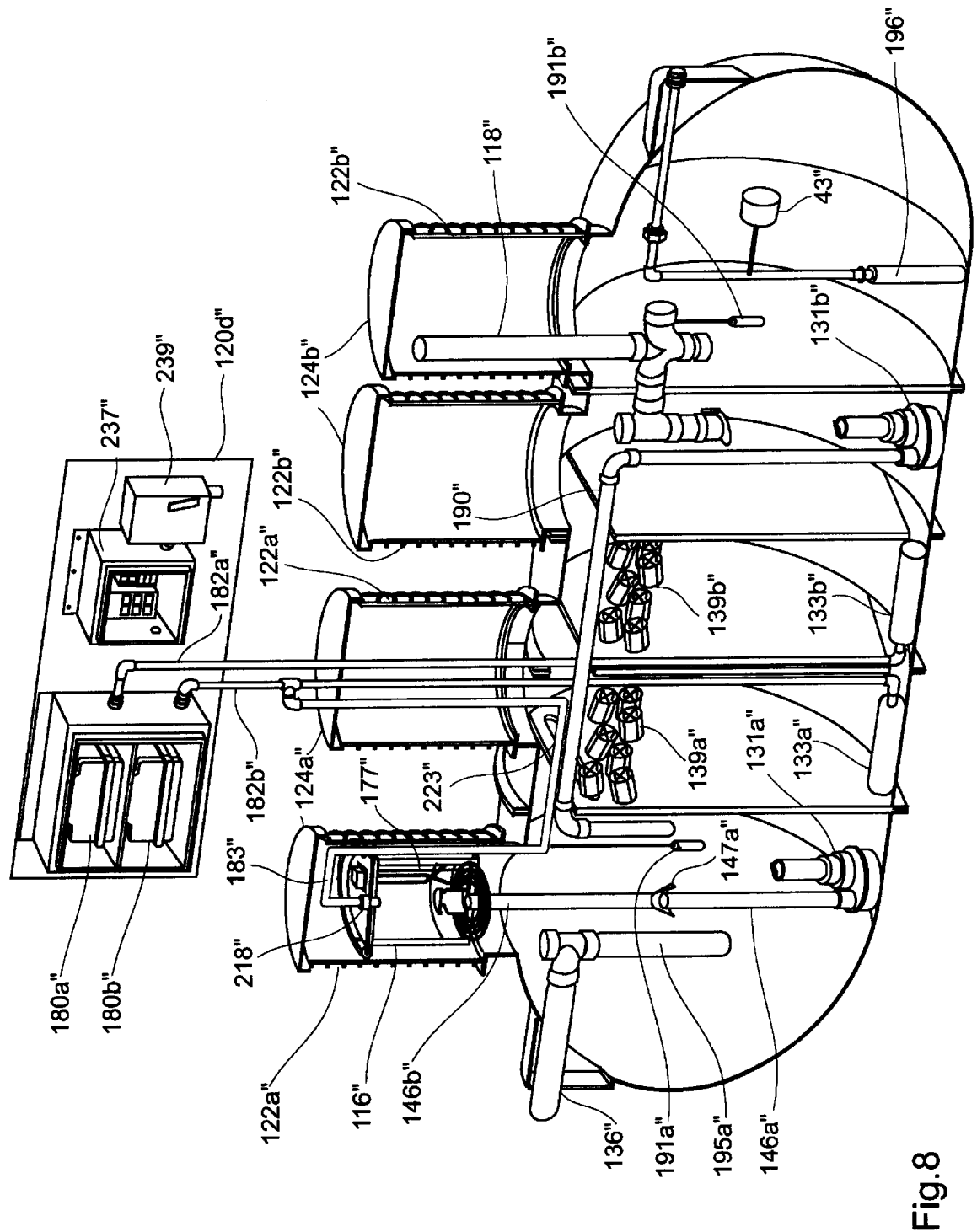
FIG. 8 is a sectional perspective view of another embodiment of the present invention.
Figure 9:
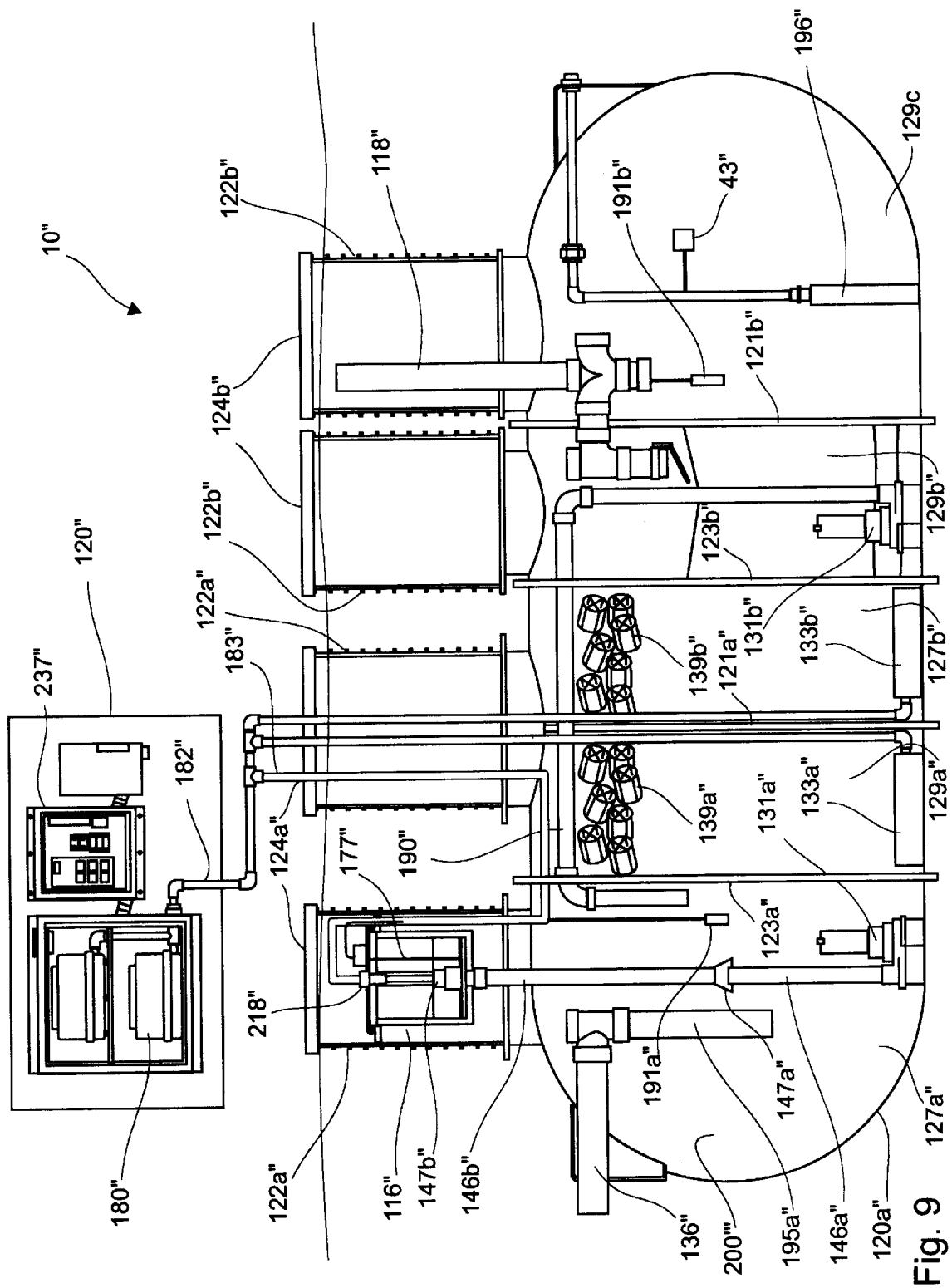
FIG. 9 is a cross section of FIG. 8.
Figure 10:
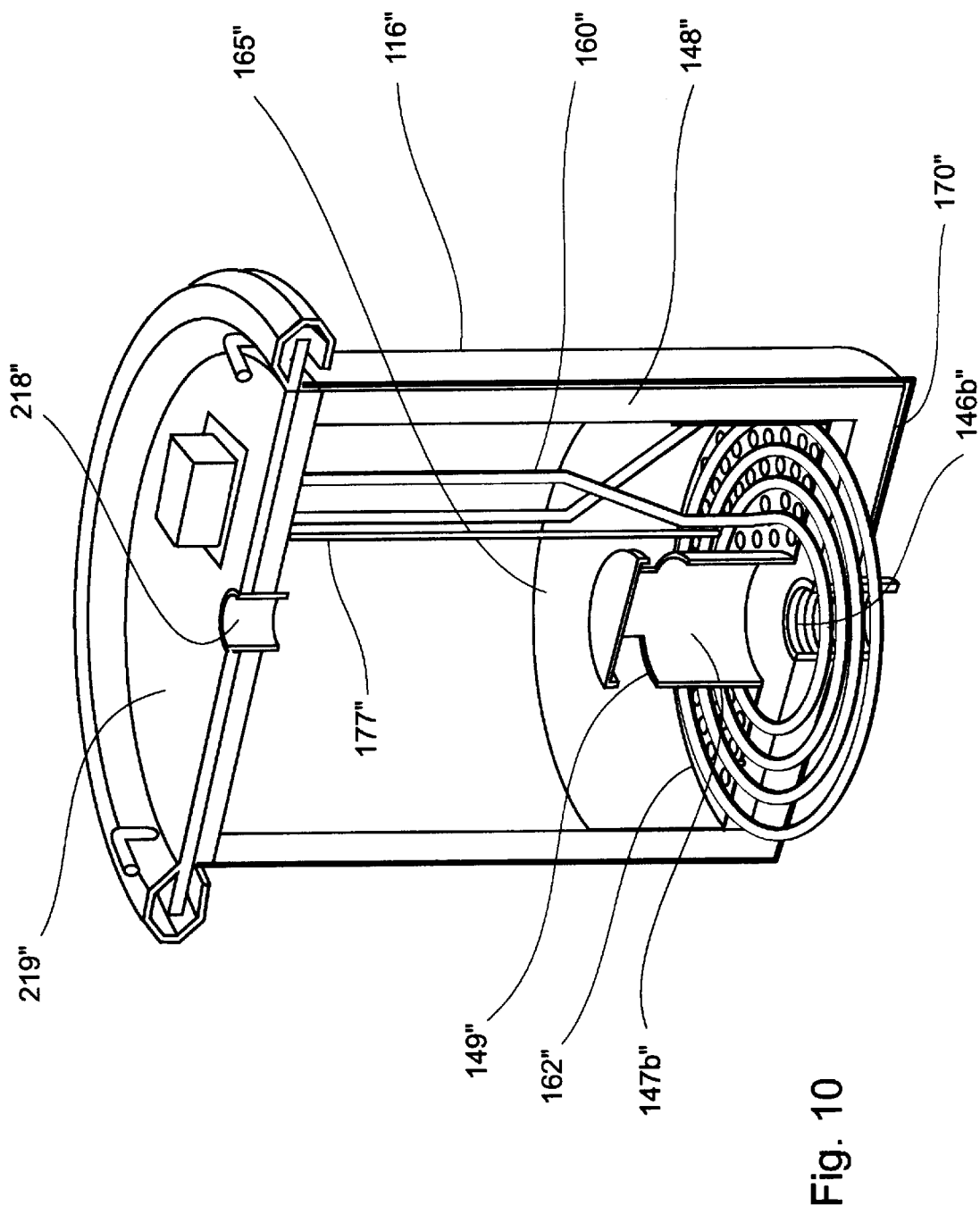
FIG. 10 is a perspective view of a processor in FIG. 8.

Still another embodiment of the invention is depicted in FIGS. 8 and 9 and is generally represented by the numeral 10". Here, the waste treatment device 10" differs in several respects. Particularly, there is no microwave employed, rather, there is provided a cast ceramic fiber internally insulated waste processor 116", as seen in FIG. 10, which is preferably removably operably disposed within one of the access ports 122a". The internal insulation 148" is an improvement over previous designs which utilized insulation external to the metal structure of the waste processor, because the external metal 150" does not get exposed to heat and thermal stress. The processor 116" is generally cylindrical which provides advantages in strength, reduced stress and economy in manufacture. A heating element 160" is operably disposed in the bottom of the processor 116" adjacent the perforated stainless steel filter media 162" and is preferably operably connected to computer based device 237". The processor 116" includes a number of improvements over previous embodiments. The previous embodiment employed uncontrolled high-temperature combustion to reduce the solid waste. Here, the thermal decompostion process employs controlled heating-dehydration-gassification and pyrolysis. This process results in reduced emissions and improved efficiency. The internal cast ceramic fiber insulation 148" improves efficiency while reducing the heat transferred to the external metal 150" of the processor 116". These features combine to make it possible to operably dispose the processor 116" in one of the access ports 122a". This results in a reduction in the space required to install the system 10". The above ground structure 120d" is now reduced in size to a cabinet which houses only the air compressors 180a", 180b" and the computer based device 237". The processor 116" incorporates a temperature probe 177" operably connected to the computer based device 237". The probe 177" is now used to measure the temperature of the heating element 160" directly. Testing has shown that reduced emissions are obtained if the element temperature is controlled at specific temperatures throughout the thermal decomposition process. Previous embodiments relied on measurement of the process gas temperature only and did not monitor the element temperature directly.

The method of transferring waste 200" into the waste processor 116" is simplified and improved over previous embodiments. Previous embodiments used one conduit for filling and one conduit for draining. The present embodiment utilizes one conduit for both functions. Further, previous embodiments relied on a level switch for controlling the fill volume. In the current embodiment, the fill volume is controlled by operating the pump 131a" for a specific period of time. In the previous embodiments, it was necessary to monitor the drain rate of the waste processor 116' to determine when the filter media 162' became clogged and a burn should be performed. The current embodiment with the integral overflow provided by open surface 149" in conduit 147b" eliminates the need for monitoring the flow rate because the clogging of the filter media 162" is not critical. To fill the waste processor 116" the pump 131a" is operated for a predetermined number of cycles. The result is a load of waste 200''' transferred to the waste processor 116".

The conduit 146a" communicably extends from the pump 131a" and into a frustoconical end 147a" of conduit 146b". Conduit 146b" extends from the waste processor 116" to a predetermined distance, e.g., 20 inches below the surface of waste 200''', to the frustoconical end 147a". There is a gap between the end 147a" and conduit 146a" to permit gravitational back flow, air flow and drainage between processor 116" and compartment 127a". Conduit 146b" communicably connects through a bottom 170" of the processor 116". A conduit portion 147b" is communicably associated to conduit 146b" and extends centrally upward into the processor 116". The open surface 149" permits the waste 200''' to be pumped therethrough. The design of this embodiment also provides for ease of connection of the processor 116" to the pump 131a".

The open surface 149" also serves as the overflow when pumping stops. The conduit portion 147b" is attached to filter shelf 162". At the circumference of filter shelf 162" is formed a vertical wall 165" extending to the height of conduit 147b". This annular wall protects the inner surface of the cast ceramic fiber insulation 148" from erosion.

The processor 116" is preferably pressurized to 20 inches of water column which de-waters the waste 200''' resulting in a more efficient burn. The processor 116" is operably connected to the compressor 180b" via conduit 183" and opening 218" in the lid of processor 116" such that there is no need for a fan in this embodiment. The airflow from compressor 180b" is precisely controlled which minimizes emissions and heat losses. The exhausted gas from the processor 116" is reintroduced into the water 200''' wherein the same is cleaned.

The device 10" depicts a generally unified structure wherein the previously described subterranean structures 120a", 120b" and 120c" are now generally cylindrical and integrally formed and includes internal walls 121a" and 121b" and 123a" and 123b". This embodiment also differs in the following ways. There is a float switch 43" disposed in the compartment 129c" which initiates pump 196" and provides High Tank Level alarm indication.

The computer based device 237" includes software which controls the temperature within the processor 116" in accordance with certain plateaus for controlled dehydration, gasification and pyrolisis. The resultant product becomes activated carbon which is subsequently combusted or flushed into the waste 200'" for digestion by the bacteria. Thus, emissions can be substantially improved over an uncontrolled incineration process. This embodiment also utilizes timed cycles, preferably controlled via the software based on empirical data, to initiate pumping of waste 200'" for processing. The computer based device 237" further includes circuitry for measuring oxidation reduction potential which is used in checking the level of chlorine or other disinfectant such as bromine or ozone in the water 200'" via ORP probe 191b as well as oxygen absence in compartment 127a" via ORP probe 191a. Absence of oxygen (anoxic) is a requirement for denitrification. The computer based device 237" further controls the pump 131b" and compressor 180a" via the software to provide a desired anoxic condition in the first compartment 127a" without sacrificing organic removal, nitrification or clarifier performance.

As previously described, the computer based device 237" is remotely accessible via a communication line, such as a telephone/modem, to permit remotely located technicians to observe and change operating conditions as needed. The software further enables the device 10" to be monitored and stores historical operational and service data as described. Similarly, a local alarm is operably connected to the computer based device 237" for alarming the user/customer of a failure warranting corrective action. While electrical connections of the above described components are not specifically shown, such connections are readily known to those skilled in the art, e.g., connections between the computer based device 237" and probes 191a" and 191b". Additionally, a power source 239" is provided for the components described.

The above described embodiments are set forth by way of example and are not for the purpose of limiting the present invention. It will be readily apparent to those skilled in the art that obvious modifications, derivations and variations can be made to the embodiments without departing from the scope of the invention. For example, other biomedia may be employed, disinfecting compounds or leach fields may be coupled with the invention. Accordingly, the claims appended hereto should be read in their full scope including any such modifications, derivations and variations.

What is claimed is:

1. A waste treatment device for treatment of waste having solids and liquids therein, which includes:
   a primary waste reservoir which receives influent waste rendering a first phase separation of solids and liquids and comprising a first compartment for separating a portion of the solids by settling from the waste and biological decomposing enhancing media and means for supplying aeration and mixing in said second compartment to provide a steady population of microorganisms for biodegrading the waste component; and
   a secondary waste reservoir operably connected to said primary waste reservoir to receive substantially liquid waste having suspended solids therein from said second compartment and including biological decomposing enhancing media and means for supplying aeration and mixing in said reservoir to provide a steady population of microorganisms for biodegrading received waste and rendering a second phase separation of solids and liquids.

2. The waste treatment device of claim 1, which further includes means for transporting primarily solids resulting from said second phase to said primary waste reservoir.

3. The waste treatment device of claim 1, which further includes a combustion chamber communicably connected to at least one of said primary waste reservoir and said secondary waste reservoir in a manner to receive waste therefrom and having means to substantially combust said waste component into a resultant gaseous biproduct, ash and aqueous biproduct.

4. The waste treatment device of claim 3, which further includes means for transferring resultant gaseous biproduct, ash and aqueous biproduct to one of said primary waste reservoir and secondary waste reservoir in a manner wherein said resultant gaseous biproduct is cleaned by direct introduction thereof into the waste within said one reservoir.

5. The waste treatment device of claim 3, wherein said combustion chamber is connected to said primary waste reservoir.

6. The waste treatment device of claim 5, which further includes means for transferring resultant gaseous biproduct, ash and aqueous biproduct to said primary waste reservoir in a manner wherein said resultant gaseous biproduct is cleaned by direct introduction thereof into the waste within said primary waste reservoir.

7. The device of claim 3, which further includes means for automatically controlling operation of said combustion chamber.

8. The device of claim 3, wherein said combustion chamber includes means for microwaving the waste.

9. The waste treatment device of claim 3, wherein said combustion chamber includes a heating element operably disposed therein with a heat conductive material operably disposed adjacent said heating element and further includes means for producing microwaves within said combustion chamber.

10. The waste treatment device of claim 3, which includes a conduit interconnecting said primary waste reservoir and said combustion chamber, wherein said conduit includes outlet means for permitting backflow from said combustion chamber to said primary waste reservoir.

11. The waste treatment device of claim 10, wherein said outlet means is further characterized as permitting backflow by gravitation.

12. The waste treatment device of claim 3, which further includes means for remotely monitoring operation of said reservoirs and said combustion chamber.

13. The waste treatment device of claim 3, which further includes a tertiary reservoir operably connected to said secondary waste reservoir to receive substantially liquid waste, wherein said tertiary reservoir includes means for disinfecting said liquid waste rendering said liquid environmentally acceptable and means for remotely monitoring operation of said reservoirs and said combustion chamber.

14. The waste treatment device of claim 1, which further includes a tertiary reservoir operably connected to said secondary waste reservoir to receive substantially liquid waste, wherein said tertiary reservoir includes means for disinfecting said liquid waste rendering said liquid waste environmentally acceptable.

15. The device of claim 14, wherein said disinfecting means includes a filtering membrane.

16. The device of claim 14, wherein said disinfecting means includes chemical additives.

17. The waste treatment device of claim 14, wherein said disinfecting means includes means operably connected thereto for irradiating the water to substantially rid said substantially liquid waste free from biological contaminants.

18. The waste treatment device of claim 1, wherein said biological decomposing enhancing media is further charaterized to include biomedia polymer.

19. The waste treatment device of claim 1, wherein said secondary waste reservoir includes a first compartment for receiving the waste from said primary waste reservoir and a second compartment connected to said first compartment in a manner for receiving substantially filtered liquids therefrom, wherein said biological decomposing enhancing media are disposed in said first compartment.

20. The waste treatment device of claim 19, which further includes a combustion chamber communicably connected to said primary waste reservoir.

21. The waste treatment device of claim 20, which further includes means for transferring resultant gaseous biproduct, ash and aqueous biproduct to said primary waste reservoir in a manner wherein said resultant gaseous biproduct is cleaned by direct introduction thereof into the waste within said primary waste reservoir.

22. The waste treatment device of claim 19, which further includes a tertiary reservoir operably connected to said secondary waste reservoir to receive substantially liquid waste, wherein said tertiary reservoir includes means for disinfecting said liquid waste rendering said liquid environmentally acceptable.

23. The waste treatment device of claim 22, wherein said primary waste reservoir, said secondary waste reservoir and said tertiary reservoir are contained in an integrally formed generally cylindrical housing.

24. The waste treatment device of claim 1, wherein said primary waste reservoir and said secondary waste reservoir are contained in an integrally formed generally cylindrical housing.

25. The waste treatment device of claim 1, which further includes means for remotely monitoring operation of said reservoirs.

26. The waste treatment device for treatment of waste having solids and liquids therein of claim 1, which includes:
 a waste reservoir which receives influent waste and includes means for treating the waste rendering the waste environmentally acceptable; and
 means for remotely monitoring operation of said waste reservoir.

27. The waste treatment device of claim 26, which further includes means for remotely controlling operation of said waste reservoir.

28. The waste treatment device of claim 1, which further includes a thermal decomposition chamber communicably connected to at least one of said primary waste reservoir and said secondary waste reservoir in a manner to receive waste therefrom and having means to substantially thermally decompose said waste into a resultant gaseous biproduct, ash and aqueous biproduct.

29. The waste treatment device of claim 28, which further includes means for transferring resultant gaseous biproduct, ash and aqueous biproduct to one of said primary waste reservoir and secondary waste reservoir in a manner wherein said resultant gaseous biproduct is cleaned by direct introduction thereof into the waste within said one reservoir.

30. The waste treatment device of claim 28, wherein said thermal decomposition chamber is connected to said primary waste reservoir.

31. The waste treatment device of claim 30, which further includes means for transferring resultant gaseous biproduct, ash and aqueous biproduct to said primary waste reservoir in a manner wherein said resultant gaseous biproduct is cleaned by direct introduction thereof into the waste within said primary waste reservoir.

32. The device of claim 28, which further includes means for automatically controlling said thermal decomposition chamber.

33. The device of claim 32, wherein said controlling means includes a thermally adjustable heating element and a thermocouple connected to said thermally adjustable heating element, a temperature controller operably connected to said heating element and said thermocouple, wherein said temperature controller senses temperature of the heating element through said thermocouple and controls the temperature of said heating element to achieve at least one of dehydration, gasification and pyrolisis of said waste.

34. The waste treatment device of claim 32, which further includes means for monitoring oxidation/reduction potential within at least one of said reservoirs and controlling flow of waste within said waste treatment device in accordance therewith.

35. The waste treatment device of claim 28, wherein said thermal decomposition chamber includes a heating element operably disposed therein with a heat conductive material operably disposed adjacent said heating element.

36. The waste treatment device of claim 28, which further includes a tertiary reservoir operably connected to said secondary waste reservoir to receive substantially liquid waste, wherein said tertiary reservoir includes means for disinfecting said liquid waste rendering said liquid environmentally acceptable.

37. The device of claim 36, wherein said disinfecting means includes a filtering membrane.

38. The device of claim 36, wherein said disinfecting means includes chemical additives.

39. The waste treatment device of claim 36, wherein said liquid processor includes means operably connected thereto for irradiating the water to substantially rid said aqueous fluid free from biological contaminants.

40. The waste treatment device of claim 36, which further includes means for monitoring chemical concentration within at least one of said reservoirs and controlling at least one of said disinfecting means and flow of waste within said waste treatment device in accordance therewith.

41. The waste treatment device of claim 28, wherein said biological decomposing enhancing media of said reservoir includes biomedia polymer.

42. The waste treatment device of claim 28, wherein said secondary waste reservoir includes a first compartment for receiving the waste from said primary waste reservoir and a second compartment connected to said first compartment in a manner for receiving substantially filtered liquids therefrom, wherein said biological decomposing enhancing media are disposed in said first compartment.

43. The waste treatment device of claim 28, wherein said primary waste reservoir and said secondary waste reservoir are contained in an integrally formed generally cylindrical housing.

44. The waste treatment device of claim 28, which further includes means for remotely monitoring and controlling operation of said waste treatment device.

45. The waste treatment device of claim 28, wherein said thermal decomposition chamber communicably connects to said primary waste reservoir in a manner to receive waste therefrom.

46. The waste treatment device of claim 45, which further includes means for transferring resultant gaseous biproduct, ash and aqueous biproduct to said primary waste reservoir in a manner wherein said resultant gaseous biproduct is cleaned by direct introduction thereof into the waste within said primary waste reservoir.

47. The waste treatment device of claim 46, which further includes a tertiary reservoir operably connected to said secondary waste reservoir to receive substantially liquid waste, wherein said tertiary reservoir includes means for disinfecting said liquid waste rendering said liquid waste environmentally acceptable.

48. The waste treatment device of claim 47, wherein said primary waste reservoir, said secondary waste reservoir and said tertiary reservoir are contained in an integrally formed generally cylindrical housing.

49. The waste treatment device of claim 28, which includes a conduit interconnecting said primary waste reservoir and said thermal decomposition chamber, wherein said conduit includes outlet means for permitting backflow from said thermal decomposition chamber to said primary waste reservoir.

50. The waste treatment device of claim 49, wherein said outlet means is further characterized as permitting backflow by gravitation.

51. The waste treatment device of claim 28, which further includes means for controllably supplying air to said thermal decomposition chamber.

52. A method for treating human waste which includes both solids and aqueous fluids, which includes the steps of:

(a) flowing solids and aqueous waste into a primary waste reservoir rendering a first phase separation of solids and liquids and comprising a first compartment for separating a portion of the solids by settling from the waste and having, a second compartment operably connected to receive a waste component including liquids and the remainder of the solids comprising biological decomposing enhancing media and means for supplying aeration and mixing in said second compartment to provide a steady population of microorganisms for biodegrading the waste component; and (b) flowing substantially liquid first phase separated waste having suspended solids therein from said primary waste reservoir to a secondary waste reservoir second compartment wherein said secondary waste reservoir includes biological decomposing enhancing media and means for supplying aeration and mixing in said reservoir to provide a steady population of microorganisms for biodegrading received waste and rendering a second phase separation of solids and liquids.

53. The method of claim 52, which further includes the steps of transferring at least a portion of at least one of said phases of separated waste to a combustion chamber and elevating temperature of transferred waste to cause combustion thereof resulting in a gaseous biproduct, aqueous biproduct and ash.

54. The method of claim 53, which further includes the step of transferring combusted waste back to one of said primary waste reservoir and said secondary waste reservoir.

55. The method of claim 52, which further includes the step of transferring at least a portion of said second phase separated waste from said secondary waste reservoir to said primary waste reservoir.

56. The method of claim 52, which further includes the step of passing liquids from said secondary phase through a disinfecting liquid processor rendering an environmentally acceptable liquid.

57. The method of claim 52 for treating human waste which includes both solids and aqueous fluids, which further includes the step of:

remotely monitoring operation of said reservoirs.

58. The method of claim 57, which further includes the step of remotely controlling operation of said reservoirs.

59. The method of claim 57, which further includes the step of passing liquids from said second phase separation through a disinfecting liquid processor rendering an environmentally acceptable liquid.

60. The method of claim 57, which further includes the steps of transferring at least a portion of at least one of said phases of separated waste to a combustion chamber and elevating temperature of transferred waste to cause combustion thereof resulting in a gaseous biproduct, aqueous biproduct and ash.

61. The method of claim 60, which further includes the step of transferring combusted waste back to one of said primary waste reservoir and said secondary waste reservoir.

* * * * *